United States Patent
Sobel et al.

(10) Patent No.: US 10,144,531 B2
(45) Date of Patent: Dec. 4, 2018

(54) REORIENTATION OF A SPINNING SPACECRAFT USING GIMBALED ELECTRIC THRUSTERS

(71) Applicant: The Boeing Company, Chicago, IL (US)

(72) Inventors: Alexander Jacob Sobel, Los Angeles, CA (US); Qinghong W. Wang, Torrance, CA (US); Gary Lemke, Torrance, CA (US); Timothy Lui, San Pedro, CA (US); Kangsik Lee, Torrance, CA (US); Glenn N. Caplin, Manhattan Beach, CA (US); Troy Allen Fontana, Torrance, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/016,197

(22) Filed: Feb. 4, 2016

(65) Prior Publication Data

US 2017/0225806 A1    Aug. 10, 2017

(51) Int. Cl.
| | |
|---|---|
| *B64G 1/24* | (2006.01) |
| *B64G 1/28* | (2006.01) |
| *B64G 1/26* | (2006.01) |
| *B64G 1/36* | (2006.01) |

(52) U.S. Cl.
CPC .............. *B64G 1/28* (2013.01); *B64G 1/26* (2013.01); *B64G 1/36* (2013.01)

(58) Field of Classification Search
CPC .................................... B64G 1/28; B64G 1/26
See application file for complete search history.

(56) References Cited

U.S. PATENT DOCUMENTS

| | | | |
|---|---|---|---|
| 4,725,024 A * | 2/1988 | Vorlicek | G05D 1/0883 244/164 |
| 5,667,171 A | 9/1997 | Fowell et al. | |
| 5,716,029 A * | 2/1998 | Spitzer | B64G 1/007 244/158.5 |
| 5,934,620 A * | 8/1999 | Abernethy | B64G 1/24 244/168 |
| 5,984,236 A * | 11/1999 | Keitel | B64G 1/24 244/164 |
| 6,032,903 A | 3/2000 | Fowell et al. | |
| 6,032,904 A * | 3/2000 | Hosick | B64G 1/26 244/169 |
| 6,053,455 A * | 4/2000 | Price | B64G 1/26 244/169 |
| 6,062,512 A | 5/2000 | Wang et al. | |

(Continued)

FOREIGN PATENT DOCUMENTS

EP          0937644 A2     8/1999

*Primary Examiner* — Jess Whittington
(74) *Attorney, Agent, or Firm* — Duft & Bornsen, PC

(57) ABSTRACT

Apparatus and methods for controlling a spacecraft for a transfer orbit. The spacecraft includes a propulsion subsystem with electric thrusters that are installed with two-axis gimbal assemblies. The spacecraft also includes a controller that identifies a target spin axis for the spacecraft, determines an actual spin axis for the spacecraft during the transfer orbit, determines gimbal angles for the electric thruster(s) that adjust the actual spin axis toward the target spin axis, and initiates a burn of the electric thruster(s) at the gimbal angles.

16 Claims, 6 Drawing Sheets

(56) References Cited

U.S. PATENT DOCUMENTS

| | | | | |
|---|---|---|---|---|
| 6,076,773 | A * | 6/2000 | Salvatore | B64G 1/1007 244/164 |
| 6,102,337 | A * | 8/2000 | Quartararo | B64G 1/26 244/169 |
| 6,435,457 | B1 * | 8/2002 | Anzel | B64G 1/26 244/169 |
| 6,481,672 | B1 * | 11/2002 | Goodzeit | B64G 1/26 244/169 |
| 6,565,043 | B1 * | 5/2003 | Wittmann | B64G 1/242 244/169 |
| 6,860,451 | B1 * | 3/2005 | Wang | B64G 1/24 244/164 |
| 7,464,898 | B1 * | 12/2008 | Goodzeit | B64G 1/26 244/164 |
| 7,665,695 | B2 * | 2/2010 | Wang | B64G 1/281 244/164 |
| 8,620,496 | B2 | 12/2013 | Liu et al. | |
| 8,763,957 | B1 * | 7/2014 | Higham | B64G 1/007 244/158.6 |
| 2006/0049315 | A1 * | 3/2006 | Patel | B64G 1/26 244/169 |
| 2011/0024571 | A1 * | 2/2011 | Tsao | B64G 1/24 244/171 |
| 2015/0001345 | A1 | 1/2015 | Polle | |
| 2016/0194095 | A1 * | 7/2016 | Weiss | B64G 1/26 701/13 |

* cited by examiner

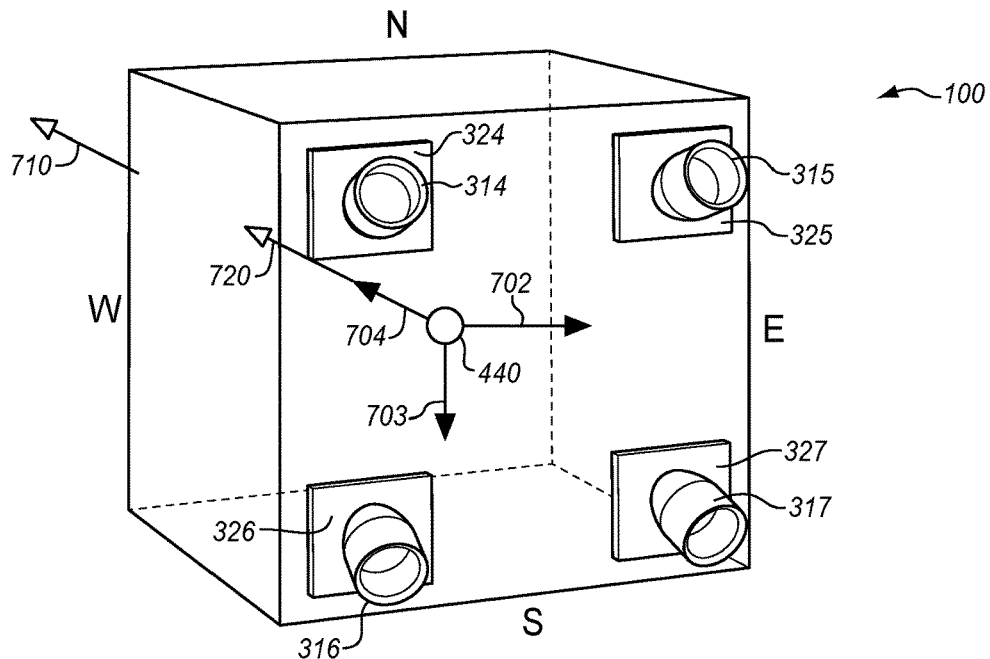
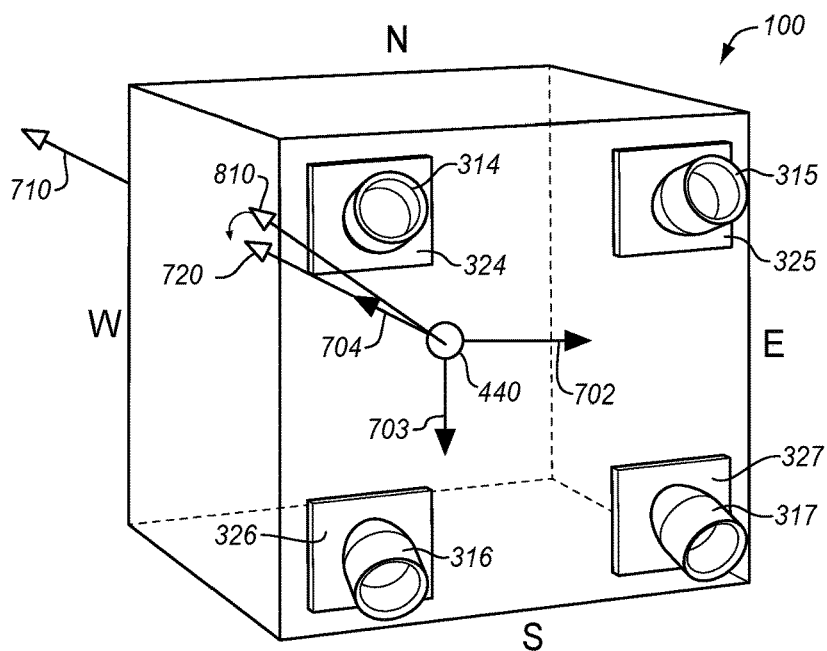

REORIENTATION OF A SPINNING SPACECRAFT USING GIMBALED ELECTRIC THRUSTERS

FIELD

This disclosure relates to the field of spacecraft, and more particularly, to transfer orbits of a spacecraft.

BACKGROUND

Satellites or other spacecraft are configured to orbit around the Earth for a variety of purposes, such as communications, exploration, etc. For example, a geosynchronous satellite orbits the Earth and follows the direction of the Earth's rotation. Geosynchronous satellites orbit at a radius of about 42,164 kilometers from the center of the Earth. One revolution of a geosynchronous satellite around the Earth takes about 24 hours, which is the same amount of time it takes for the Earth to rotate once about its axis. These types of satellites are considered geosynchronous because they appear stationary when viewed from a particular location on the Earth, and are commonly used as communication satellites.

To put a geosynchronous satellite into a geosynchronous orbit, the satellite is loaded into a payload of a launch vehicle, and the launch vehicle carries the satellite into space. The launch vehicle may not carry the satellite all the way to the geosynchronous orbit (e.g., 42,164 kilometers), but instead releases the satellite at a lower orbit. The lower orbit may be a few hundred kilometers from Earth. The satellite then performs maneuvers with onboard thrusters to enter a transfer orbit that takes the satellite to the geosynchronous altitude.

Three-axis attitude control may be performed in the transfer orbit. For example, solar power may support the maneuvers of the satellite after separation from the launch vehicle, so the solar panels on the satellite are deployed after separation. High disturbance torques on the satellite makes it difficult to maintain attitude control when passing through low perigees. Therefore, it is desirable to identify new and improved ways for raising a satellite to a higher orbit before reaching a geosynchronous orbit.

SUMMARY

Spinning a spacecraft (e.g., a satellite) in a transfer orbit mitigates issues of attitude control by providing gyroscopic rigidity. The systems and methods described herein reorient the axis upon which the spacecraft spins in the transfer orbit using electric thrusters. In a powered ascent, low-thrust electric thrusters produce a velocity change (ΔV) in the spacecraft to raise the orbit of the spacecraft. In the embodiments described herein, the electric thrusters may be used to control or adjust the actual spin axis of the spacecraft during an orbit. The spacecraft has a preferred or target spin axis, and gimbal angles of the electric thrusters may be adjusted so that the spacecraft rotates on the target spin axis. One embodiment comprises a spacecraft having a bus having a nadir side and a zenith side opposite the nadir side. The spacecraft also has a propulsion subsystem that includes a plurality of electric thrusters installed on the zenith side of the bus, where each of the electric thrusters is coupled to the bus by a two-axis gimbal assembly. The spacecraft also includes a controller configured to identify a target spin axis for the spacecraft, to determine an actual spin axis for the spacecraft during a transfer orbit, to determine gimbal angles for at least one of the electric thrusters that adjust the actual spin axis toward the target spin axis, and to initiate a burn of the at least one electric thruster at the determined gimbal angles.

In another embodiment, the at least one of the electric thrusters is directed at the determined gimbal angles to produce a torque that adjusts the actual spin axis toward the target spin axis.

In another embodiment, the controller is configured to determine first gimbal angles for the at least one of the electric thrusters so that thrust forces from the at least one thruster are aligned with the target spin axis, and the thrust forces are spaced by a moment arm from a center of mass of the spacecraft. The controller is configured to determine second gimbal angles for the at least one of the electric thrusters to change the moment arm of the thrust forces to produce a different torque on the spacecraft.

In another embodiment, the target spin axis maximizes exposure of solar panels on the spacecraft to the Sun.

In another embodiment, the controller is configured to determine the actual spin axis for the spacecraft by receiving data from at least one sensor, and determining an angular velocity vector for the spacecraft based on the data.

In another embodiment, the spacecraft further comprises a sensor subsystem that includes an attitude sensor configured to provide measurement data of an attitude of the spacecraft.

In another embodiment, the spacecraft further comprises a sensor subsystem that includes a rate sensor configured to provide measurement data of an angular velocity of the satellite.

In another embodiment, the plurality of electric thrusters includes a northwest thruster, a northeast thruster, a southwest thruster, and a southeast thruster installed on the zenith side of the bus. The electric thrusters may use xenon as a propellant.

Another embodiment comprises a method for controlling of a spacecraft in a transfer orbit. The spacecraft includes a bus having a nadir side and a zenith side opposite the nadir side, and a propulsion subsystem that includes a plurality of electric thrusters installed on the zenith side of the bus by a two-axis gimbal assembly. The method includes identifying a target spin axis for the spacecraft, determining an actual spin axis for the spacecraft during the transfer orbit, determining gimbal angles for at least one of the electric thrusters that adjust the actual spin axis toward the target spin axis, and initiating a burn of the at least one electric thruster at the determined gimbal angles.

Another embodiment comprises a controller configured to control a spacecraft in a transfer orbit. The spacecraft comprises a bus having a nadir side and a zenith side opposite the nadir side, and a propulsion subsystem that includes a plurality of electric thrusters installed on the zenith side of the bus, where each of the electric thrusters is coupled to the bus by a two-axis gimbal assembly. The controller is configured to identify a target spin axis for the spacecraft, to determine an actual spin axis for the spacecraft during the transfer orbit, to determine gimbal angles for at least one of the electric thrusters that adjust the actual spin axis toward the target spin axis, and to initiate a burn of the at least one electric thruster at the determined gimbal angles.

The features, functions, and advantages that have been discussed can be achieved independently in various embodiments or may be combined in yet other embodiments, further details of which can be seen with reference to the following description and drawings.

DESCRIPTION OF THE DRAWINGS

Some embodiments of the present invention are now described, by way of example only, with reference to the accompanying drawings. The same reference number represents the same element or the same type of element on all drawings.

FIG. 7 illustrates a target spin axis for a satellite in an exemplary embodiment.

FIG. 8 illustrates an actual spin axis for a satellite in an exemplary embodiment.

DETAILED DESCRIPTION

The figures and the following description illustrate specific exemplary embodiments. It will be appreciated that those skilled in the art will be able to devise various arrangements that, although not explicitly described or shown herein, embody the principles described herein and are included within the contemplated scope of the claims that follow this description. Furthermore, any examples described herein are intended to aid in understanding the principles of the disclosure, and are to be construed as being without limitation. As a result, this disclosure is not limited to the specific embodiments or examples described below, but by the claims and their equivalents.

Figure 1:
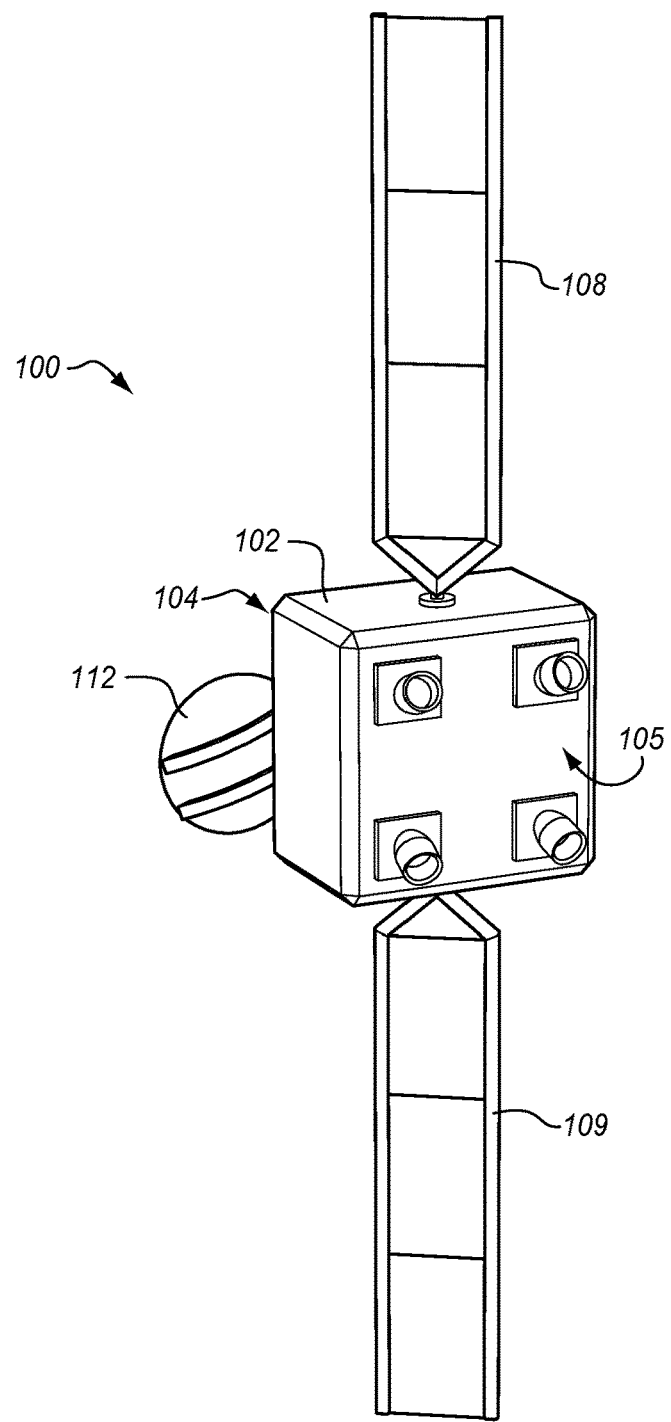
FIG. 1 illustrates a satellite in an exemplary embodiment.

FIG. 1 illustrates a satellite 100 in an exemplary embodiment. Although the term "satellite" is used herein, the embodiments described below apply to any type of spacecraft or space vehicle. Satellite 100 includes a main body frame that carries a payload, which is referred to as a bus 102. When viewed from the Earth or another primary body, bus 102 includes a nadir side 104 (i.e., front side) and an opposing zenith side 105 (i.e., back side or anti-nadir side). The terms "side" or "face" may be used interchangeably when discussing bus 102. Satellite 100 also includes solar wings 108-109 that are attached to bus 102, and may be used to derive electricity from the Sun to power different components on satellite 100. Satellite 100 also includes instruments or subsystems, such as one or more antennas 112 that may be used for communications. The structure of satellite 100 shown in FIG. 1 is an example, and may vary as desired.

Figure 2:
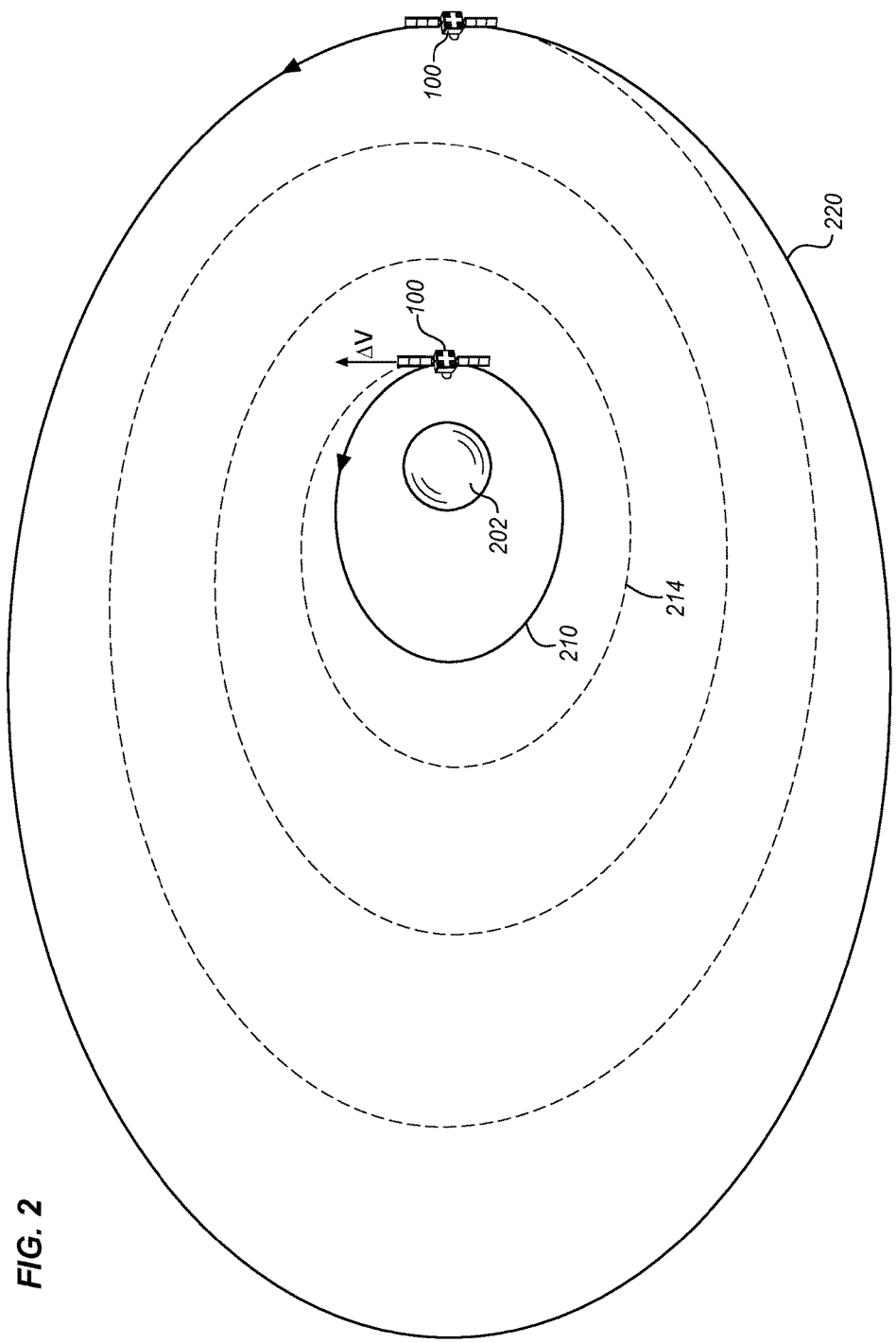
FIG. 2 illustrates raising a satellite from one orbit to another in an exemplary embodiment.

Satellite 100 may comprise a geosynchronous satellite that orbits the Earth and follows the direction of the Earth's rotation. Satellite 100 is initially released into space by a launch vehicle and begins to orbit the Earth at an altitude that is much lower than a geosynchronous altitude. Satellite 100 then performs orbital maneuvers to rise from the initial orbit to the geosynchronous orbit on a "transfer orbit". A transfer orbit is defined herein as a trajectory by which satellite 100 moves from one orbit to another. FIG. 2 illustrates satellite 100 rising from one orbit to another in an exemplary embodiment. When satellite 100 is initially launched from the Earth 202 in a launch vehicle, it separates from the launch vehicle and begins to orbit the Earth 202 at an initial orbit 210. The solar panels 108-109 (see FIG. 1) are deployed from satellite 100 after separation from the launch vehicle to obtain power from the Sun. To raise the height of the orbit to another orbit (e.g., geosynchronous), thruster burns are performed to change the velocity (the change in velocity is referred to as ΔV) of satellite 100. The ΔV raises the altitude of the orbit for satellite 100. Satellite 100 may take a spiral-like transfer orbit 214 (illustrated as a dotted line) until it reaches a final (e.g., geosynchronous) orbit 220. The transfer orbit 214 illustrated in FIG. 2 is just an example to show how satellite 100 may raise in altitude due to velocity changes.

Some satellites may use chemical thrusters in maneuvers for a transfer orbit. A chemical thruster is a type of thruster that burns liquid propellant to produce thrust. One type of chemical thruster is referred to as a bipropellant (or biprop) thruster that burns a liquid fuel and a liquid oxidizer in a combustion chamber. Satellite 100 uses a propulsion subsystem for maneuvers in a transfer orbit that includes only electric thrusters. An electric thruster is a type of "low-thrust" thruster (e.g., produces thrust that is less than 0.1 Newton) that produces electric thrust by accelerating ions. In a typical electric thruster, a propellant (e.g., xenon) is injected into an ionization chamber and ionized by electron bombardment. The ions are then accelerated by an electromagnetic field, and emitted from the thruster as exhaust that produces thrust. One example of an electric thruster is a Xenon Ion Propulsion System (XIPS©) manufactured by L-3 Communications of Aurora, Colo.

Figure 3:
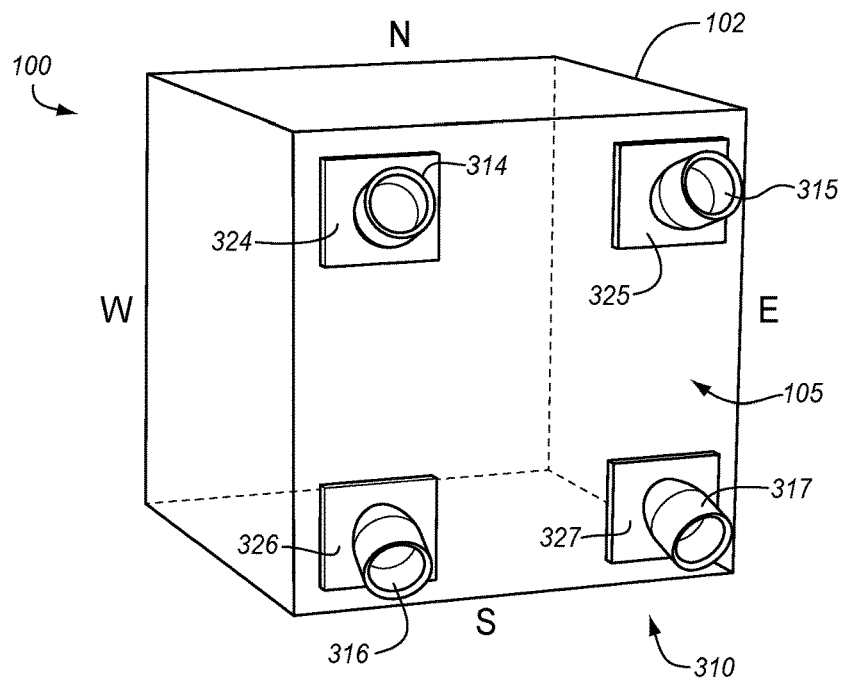
FIG. 3 illustrates a propulsion subsystem for a satellite in an exemplary embodiment.

FIG. 3 illustrates a propulsion subsystem 310 for satellite 100 in an exemplary embodiment. The view in FIG. 3 is of the zenith side 105 of satellite bus 102. The top side of bus 102 is referred to as the north side (indicated by "N"), and the bottom side of bus 102 is referred to as the south side (indicated by "S"). The left side of bus 102 in FIG. 3 is referred to as the west side (indicated by "W"), and the right side of bus 102 in FIG. 3 is referred to as the east side (indicated by "E"). The zenith side 105 of bus 102 includes thrusters 314-317 that are part of propulsion subsystem 310.

Thrusters 314-317 are respectively positioned in northwest, northeast, southwest, and southeast regions of zenith side 105 in this embodiment. Each thruster 314-317 is coupled to bus 102 by a gimbal assembly. For example, northwest thruster 314 is coupled to bus 102 by gimbal assembly 324, northeast thruster 315 is coupled to bus 102 by gimbal assembly 325, southwest thruster 316 is coupled to bus 102 by gimbal assembly 326, and southeast thruster 317 is coupled to bus 102 by gimbal assembly 327. Each gimbal assembly 324-327 is configured to pivot along two axes to alter the thrust vector of its corresponding thruster 314-317. The gimbal angles for each gimbal assembly are referred to herein as $\rho$ and $\gamma$. Although not specifically shown in FIG. 3, gimbal assemblies 324-327 may include gimbals or gimbal units, rotary motors that control movement of the gimbals, and rotary encoders that determine the mechanical position of the gimbals.

The number or positions of thrusters 314-317 as shown in FIG. 3 is for an exemplary configuration, and other thruster configurations may be used in other embodiments. Also, other thrusters may be used on satellite 100 for stationkeeping maneuvers that are not illustrated in FIG. 3.

Figure 4:
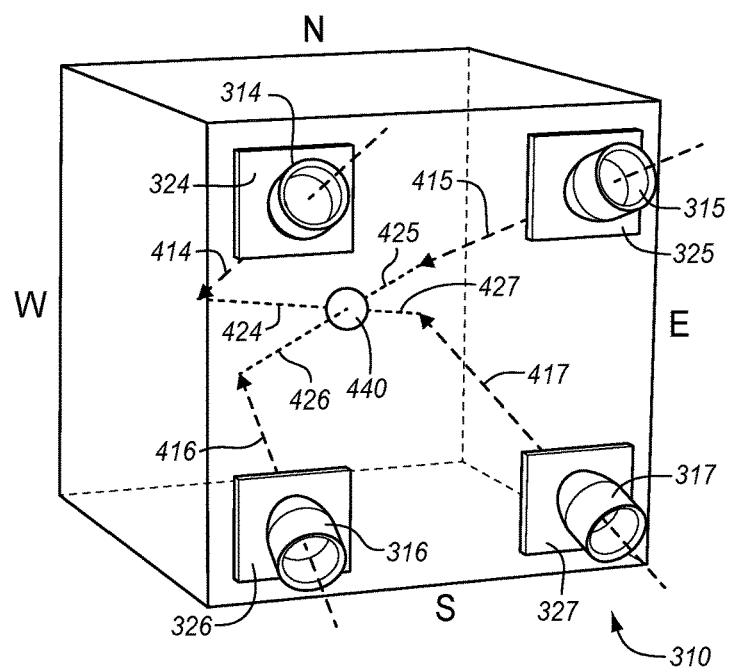
FIG. 4 illustrates thrust lines of thrusters for a propulsion subsystem in an exemplary embodiment.

FIG. 4 illustrates the thrust lines of thrusters 314-317 for propulsion subsystem 310 in an exemplary embodiment. Each thruster 314-317 is capable of producing thrust forces that create a ΔV in satellite 100. Thrust line 414 represents the direction of a thrust force produced by thruster 314. Thrust line 415 represents the direction of a thrust force produced by thruster 315. Thrust line 416 represents the direction of a thrust force produced by thruster 316. Thrust line 417 represents the direction of a thrust force produced by thruster 317. The thrust lines for each thruster 314-317 may be altered from what is shown in FIG. 4 because thrusters 314-317 are gimbaled. Thrusters 314-317 can be directed so that their thrust lines are spaced by moment arms from the center of mass (COM) 440 of satellite 100. For instance, thrust line 414 is spaced from the center of mass 440 by moment arm 424, thrust line 415 is spaced from the center of mass 440 by moment arm 425, thrust line 416 is spaced from the center of mass 440 by moment arm 426, and thrust line 417 is spaced from the center of mass 440 by moment arm 427. A thruster 314-317 directed to have a moment arm R and generating a force F can induce a torque T in satellite 100 (i.e., T=R×F). Therefore, the attitude or orientation of satellite 100 may be controlled based on the moment arms and the force (or amount of thrust) of thrusters 314-317.

In the embodiment described below, satellite 100 is allowed to spin in at least a portion of the transport orbit (e.g., through low perigees). In some traditional transfer orbits, three-axis attitude control was maintained for the satellite as it moved from one orbit to another. Unfortunately, the satellite is subjected to different forces that make three-axis attitude control difficult when passing through low perigees. In the embodiments described herein, satellite 100 is allowed to spin about a fixed axis of the spacecraft instead of maintaining three-axis attitude control, and is stabilized by thrusters 314-317.

Figure 5:
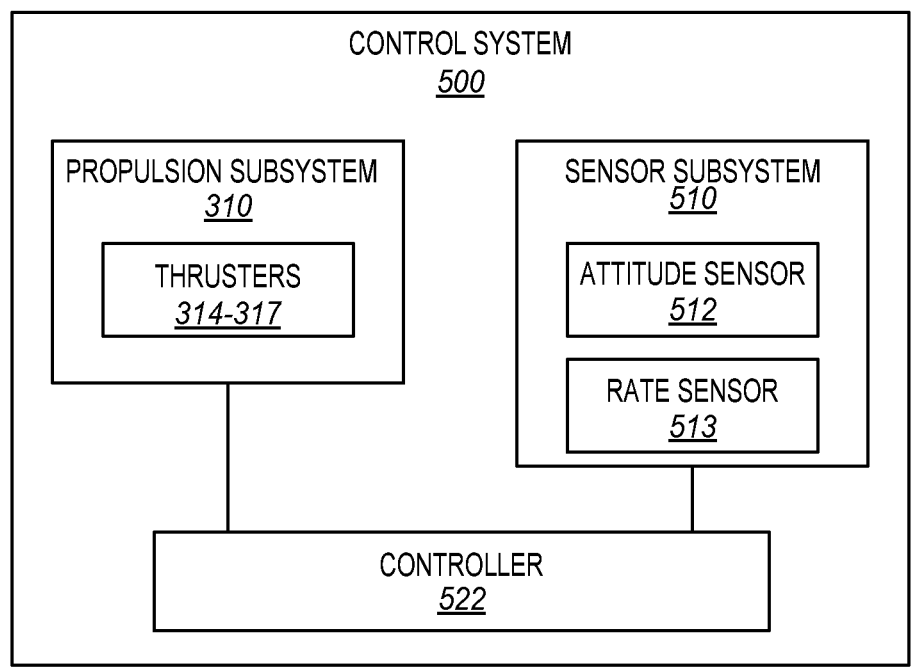
FIG. 5 is a schematic diagram of a control system for orbital maneuvers in an exemplary embodiment.

FIG. 5 is a schematic diagram of a control system 500 for orbital maneuvers in an exemplary embodiment. Control system 500 includes propulsion subsystem 310, a sensor subsystem 510, and a controller 522. Propulsion subsystem 310 is a system that uses electric thrusters 314-317 to create a ΔV in satellite 100 in a transfer orbit. Propulsion subsystem 310 may also be used for attitude control, inclination control, etc., when satellite 100 reaches a desired orbit (e.g., geosynchronous). Sensor subsystem 510 is a system that is able to provide measurement data of the attitude or rate of satellite 100. Sensor subsystem 510 may include one or more attitude sensors 512 that are capable of providing measurement data for determining the orientation of satellite 100, one or more rate sensors 513 that are capable of providing measurement data for determining an angular velocity of satellite 100, etc. Some examples of sensors 512-513 include a gyroscope, a Star tracker, etc. Controller 522 is coupled to propulsion subsystem 310 and sensor subsystem 510. Controller 522 comprises devices, components, or modules (including hardware, software, or a combination of hardware and software) that process data from sensor subsystem 510, and computes control signals for propulsion subsystem 310. Controller 522 may be located on Earth, and able to communicate with subsystems 310 and 510 via wireless signals. Controller 522 may alternatively be located on satellite 100. Controller 522 may alternatively be modularized with a portion of controller 522 located on Earth, and a portion located locally on satellite 100.

Figure 6:
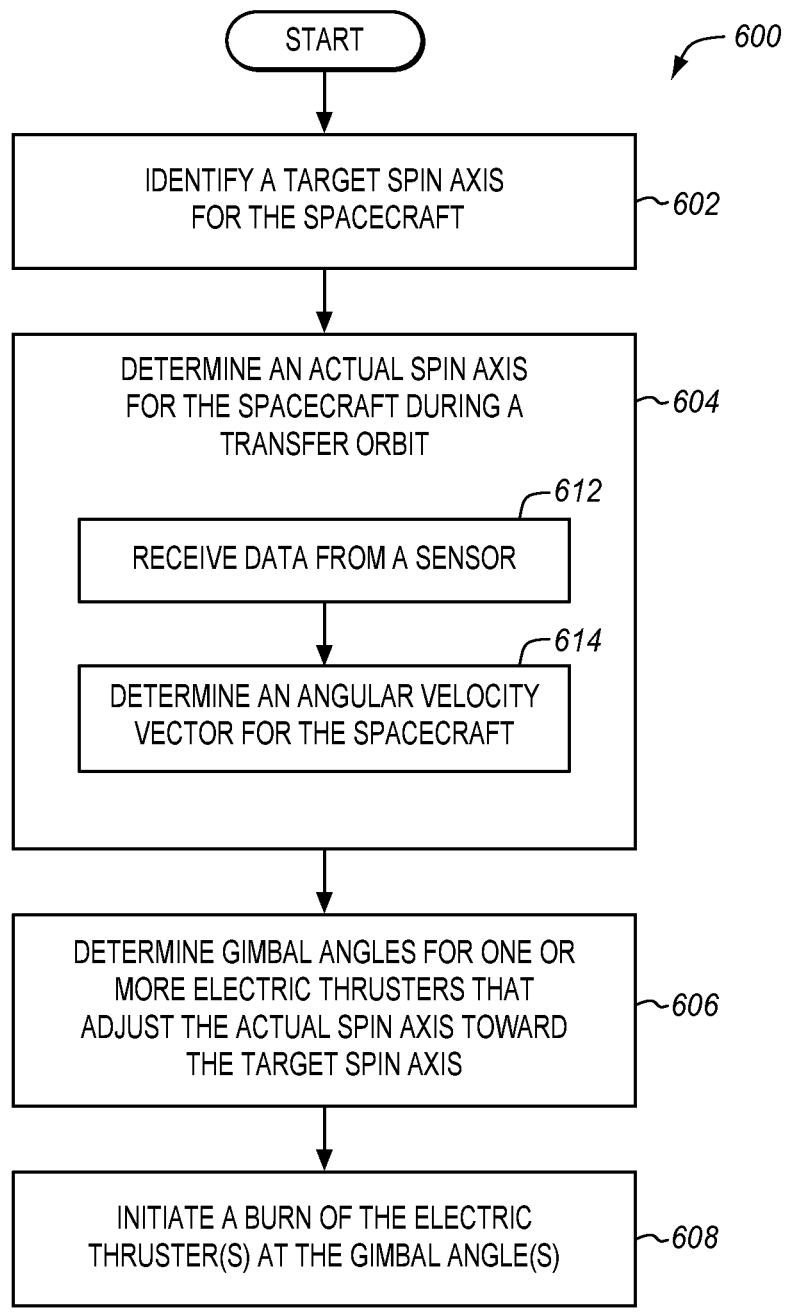
FIG. 6 is a flow chart illustrating a method for spin stabilization of a satellite during an orbit maneuver in an exemplary embodiment.

FIG. 6 is a flow chart illustrating a method 600 for spin stabilization of satellite 100 during an orbit maneuver in an exemplary embodiment. The steps of method 600 will be described with respect to satellite 100, although one skilled in the art will understand that the methods described herein may be performed for other satellites or systems not shown. The steps of the methods described herein are not all inclusive and may include other steps not shown. The steps for the flow charts shown herein may also be performed in an alternative order.

It is assumed that satellite 100 has been transported into space with a launch vehicle, has separated from the launch vehicle, and solar panels 108-109 have been deployed (see FIG. 1). Satellite 100 will begin to move in its initial orbit when separating from the launch vehicle (see FIG. 2). Control system 500 will then control maneuvers of satellite 100 in a transfer orbit that raises satellite 100 from the initial orbit to the final orbit.

Controller 522 identifies a target spin axis for satellite 100 (step 602) in the inertial frame. Based on mission requirements, mission control personnel may predetermine or choose a geometric body fixed axis for satellite 100 to spin about, which is referred to as the target spin axis. For example, one goal in the transfer orbit may be to maximize exposure of the solar panels 108-109 to the Sun. Thus, personnel may determine a target spin axis for satellite 100 that maximizes exposure of solar panels 108-109 to the Sun. Another consideration for the target spin axis may be the target ΔV direction in the transfer orbit. Another consideration may be the geometry of satellite 100. Data for the target spin axis may be loaded into memory and retrieved by controller 522.

FIG. 7 illustrates a target spin axis 710 for satellite 100 in an exemplary embodiment. The attitude of satellite 100 may be defined with reference to a coordinate system having an x-axis 702, a y-axis 703, and a z-axis 704. The target spin axis 710 in this embodiment is along the z-axis 704. However, the target spin axis 710 may be any direction to raise the altitude of satellite 100. FIG. 7 also illustrates a target ΔV direction 720 for satellite 100 in the transfer orbit.

Controller 522 determines an actual spin axis for satellite 100 during the transfer orbit (step 604 of FIG. 6) in the inertial frame. The actual spin axis indicates the true axis of rotation for satellite 100 at any point in time during the transfer orbit. For example, controller 522 may receive data in real-time from sensors 512-513 that indicates an attitude of satellite 100, an angular velocity for satellite 100, and so on (step 612). Controller 522 may determine an angular velocity vector for satellite 100 based on the data (step 614). The direction of the angular velocity vector may be used to indicate the actual spin axis for satellite 100. FIG. 8 illustrates an actual spin axis 810 for satellite 100 in an exemplary embodiment. The actual spin axis 810 in this embodiment is not aligned with the target spin axis 710.

Controller 522 determines gimbal angles for one or more electric thrusters 314-317 that adjust or reorient the actual spin axis 810 toward the target spin axis 710 (step 606). A burn of one or more electric thrusters 314-317 produces the ΔV in a thrust direction. The gimbal angles for the electric thruster(s) 314-317 may be initially set to produce thrust forces parallel to or aligned with the target spin axis 710 in a maneuver instead of through the center of mass 440. For a spinning spacecraft, the thrust vector is ideally aligned with the spin axis of the spacecraft to maximize thrust vector efficiency. For example, controller 522 may receive data from attitude sensor 512 indicating the present attitude of satellite 100, and may orient satellite 100 such that the thrust vector in the spacecraft body frame is aligned with the desired target ΔV direction. The target ΔV direction is computed in order to achieve the proper change in orbital elements required to place the spacecraft into the final orbit. Pointing the thrust forces parallel to the target ΔV direction minimizes cosine loss for the thrusters.

However, to adjust the actual spin axis 810 of satellite 100 toward the target spin axis 710, the gimbal angles of the electric thruster(s) 314-317 used in a maneuver may be adjusted so that the moment arms are changed. The moment arms of the electric thrusters 314-317 create a torque on satellite 100 that changes the actual spin axis 810 of satellite 100, and reorients the actual spin axis 810 to be aligned with the target spin axis 710.

Controller 522 then initiates a burn of the electric thruster(s) 314-317 at the gimbal angles (step 608). The gimbal angles change the moment arms of the thrust forces. When the moment arms change, electric thrusters 314-317 produce a different torque that acts to change the actual spin axis 810 of satellite 100. The goal is to align (within a tolerance) the actual spin axis 810 with the target spin axis 710 using thrusters 314-317.

Method 600 is performed continuously while satellite 100 is in the transfer orbit to correct the rotation axis of satellite 100 with thrusters 314-317. Other devices on satellite 100 may also be used to assist in stabilizing the rotation of satellite 100 along the target spin axis 710, such as a momentum storage subsystem (e.g., momentum wheels). Stabilization of a spinning satellite is described in U.S. Pat. No. 6,062,512, which is incorporated by reference.

Any of the various elements shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope is not limited to those specific embodiments. Rather, the scope is defined by the following claims and any equivalents thereof.

The invention claimed is:

1. A spacecraft comprising:
a bus having a nadir side and a zenith side opposite the nadir side;
a propulsion subsystem that includes a plurality of electric thrusters installed on the zenith side of the bus to produce a change in velocity on the spacecraft, wherein each of the electric thrusters is coupled to the bus by a two-axis gimbal assembly; and
a controller configured to identify a target spin axis for the spacecraft in a body-fixed frame as the spacecraft is allowed to spin during the transfer orbit, to determine gimbal angles for at least one of the electric thrusters so that thrust forces from the at least one electric thruster are parallel to the target spin axis in the body-fixed frame as the spacecraft spins during the transfer orbit, to initiate a burn of the at least one electric thruster at the gimbal angles, and to stabilize the spin of the spacecraft along the target spin axis in the body-fixed frame with a momentum storage subsystem;
the controller is further configured to identify a target spin axis for the spacecraft in the inertial frame as the spacecraft is allowed to spin during the transfer orbit, to determine an actual spin axis for the spacecraft in the inertial frame as the spacecraft spins during the transfer orbit, to adjust the gimbal angles for the at least one electric thruster to change the thrust forces away from the target spin axis in the body-fixed frame and produce a torque on the spacecraft to adjust the actual spin axis in the inertial frame toward the target spin axis in the inertial frame, and to initiate a burn of the at least one electric thruster at the adjusted gimbal angles.

2. The spacecraft of claim 1 wherein:
the controller is further configured to determine the first gimbal angles for the at least one electric thruster so that the thrust forces from the at least one electric thruster are aligned with the target spin axis in the body-fixed frame, wherein the thrust forces are spaced by a moment arm from a center of mass of the spacecraft; and
the controller is further configured to adjust the gimbal angles for the at least one electric thruster to change the moment arm of the thrust forces to produce the torque on the spacecraft.

3. The spacecraft of claim 1 wherein:
the target spin axis in the inertial frame maximizes exposure of solar panels on the spacecraft to the Sun.

4. The spacecraft of claim 1 wherein:
the controller is further configured to determine the actual spin axis for the spacecraft in the inertial frame by:
receiving data from at least one sensor; and
determining an angular velocity vector for the spacecraft based on the data, wherein a direction of the angular velocity vector indicates the actual spin axis for the spacecraft in the inertial frame.

5. The spacecraft of claim 1 further comprising:
a sensor subsystem that includes an attitude sensor configured to provide measurement data of an attitude of the spacecraft.

6. The spacecraft of claim 1 further comprising:
a sensor subsystem that includes a rate sensor configured to provide measurement data of an angular velocity of the spacecraft.

7. The spacecraft of claim 1 wherein:
the plurality of electric thrusters includes a northwest thruster, a northeast thruster, a southwest thruster, and a southeast thruster installed on the zenith side of the bus.

8. The spacecraft of claim 1 wherein:
the electric thrusters use xenon as a propellant.

9. A method for controlling a spacecraft in a transfer orbit, wherein the spacecraft comprises a bus having a nadir side and a zenith side opposite the nadir side, and a propulsion subsystem that includes a plurality of electric thrusters installed on the zenith side of the bus by a two-axis gimbal assembly, the method comprising:

identifying a target spin axis for the spacecraft in a body-fixed frame as the spacecraft is allowed to spin during the transfer orbit;

determining gimbal angles for at least one of the electric thrusters that so that thrust forces from the at least one electric thruster are parallel to the target spin axis in the body-fixed frame as the spacecraft spins during the transfer orbit;

initiating a burn of the at least one electric thruster at the gimbal angles;

stabilizing the spin of the spacecraft along the target spin axis in the body-fixed frame with a momentum storage subsystem;

identifying a target spin axis for the spacecraft in the inertial frame as the spacecraft is allowed to spin during the transfer orbit;

determining an actual spin axis for the spacecraft in the inertial frame as the spacecraft spins during the transfer orbit;

adjusting the gimbal angles for at least one electric thruster to change the thrust forces away from the target spin axis in the body-fixed frame and produce a torque on the spacecraft to adjust the actual spin axis in the inertial frame toward the target spin axis in the inertial frame; and initiating a burn of the at least one electric thruster at the adjusted gimbal angles.

10. The method of claim 9 wherein:

determining the gimbal angles for the at least one electric thruster comprises determining the gimbal angles for the at least one electric thruster so that the thrust forces from the at least one electric thruster are aligned with the target spin axis in the body-fixed frame, wherein the thrust forces are spaced by a moment arm from a center of mass of the spacecraft; and adjusting the gimbal angles comprises adjusting the gimbal angles for the at least one electric thruster to change the moment arm of the thrust forces to produce the torque on the spacecraft.

11. The method of claim 9 wherein:

the target spin axis in the inertial frame maximizes exposure of solar panels on the spacecraft to the Sun.

12. The method of claim 9 wherein determining the actual spin axis for the spacecraft in the inertial frame comprises:

receiving data from at least one sensor; and determining an angular velocity vector for the spacecraft based on the data, wherein a direction of the angular velocity vector indicates the actual spin axis in the inertial frame.

13. An apparatus comprising:

a controller configured to control a spacecraft in a transfer orbit, wherein the spacecraft comprises:

a bus having a nadir side and a zenith side opposite the nadir side; and a propulsion subsystem that includes a plurality of electric thrusters installed on the zenith side of the bus to produce a change in velocity on the spacecraft, wherein each of the electric thrusters is coupled to the bus by a two-axis gimbal assembly;

the controller is further configured to identify a target spin axis for the spacecraft in a body-fixed frame as the spacecraft is allowed to spin during the transfer orbit, to determine gimbal angles for at least one of the electric thrusters so that thrust forces from the at least one electric thruster are parallel to the target spin axis in the body-fixed frame as the spacecraft spins during the transfer orbit, to initiate a burn of the at least one electric thruster at the gimbal angles, and to stabilize the spin of the spacecraft along the target spin axis in the body-fixed frame with a momentum storage subsystem;

the controller is further configured to identify a target spin axis for the spacecraft in the inertial frame as the spacecraft is allowed to spin during the transfer orbit, to determine an actual spin axis for the spacecraft in the inertial frame as the spacecraft spins during the transfer orbit, to adjust the gimbal angles for the at least one electric thruster to change the thrust forces away from the target spin axis in the body-fixed frame and produce a torque on the spacecraft to adjust the actual spin axis in the inertial frame toward the target spin axis in the inertial frame, and to initiate a burn of the at least one electric thruster at the adjusted gimbal angles.

14. The apparatus of claim 13 wherein:

the controller is further configured to determine the gimbal angles for the at least one electric thruster so that the thrust forces from the at least one electric thruster are aligned with the target spin axis in the body-fixed frame, wherein the thrust forces are spaced by a moment arm from a center of mass of the spacecraft; and the controller is further configured to adjust the gimbal angles for the at least one electric thruster to change the moment arm of the thrust forces to produce the torque on the spacecraft.

15. The apparatus of claim 13 wherein:

the target spin axis in the inertial frame maximizes exposure of solar panels on the spacecraft to the Sun.

16. The apparatus of claim 13 wherein:

the controller is further configured to determine the actual spin axis for the spacecraft in the inertial frame by:

receiving data from at least one sensor; and determining an angular velocity vector for the spacecraft based on the data, wherein a direction of the angular velocity vector indicates the actual spin axis in the inertial frame.

* * * * *